United States Patent
Fukushima et al.

(10) Patent No.: US 9,861,956 B2
(45) Date of Patent: *__Jan. 9, 2018__

(54) PHOTOCATALYTIC COATING COMPOSITION

(71) Applicant: TOTO LTD., Kitakyushu-shi, Fukuoka (JP)

(72) Inventors: Tetsuya Fukushima, Fukuoka (JP); Hiroaki Shimomura, Fukuoka (JP); Susumu Adachi, Fukuoka (JP); Takeshi Ikeda, Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,205

(22) Filed: Mar. 29, 2016

(65) Prior Publication Data

US 2016/0288092 A1 Oct. 6, 2016

(30) Foreign Application Priority Data

Mar. 31, 2015 (JP) .................. 2015-074527
Mar. 31, 2015 (JP) .................. 2015-074528

(Continued)

(51) Int. Cl.
*B01J 21/00* (2006.01)
*B01J 21/06* (2006.01)
(Continued)

(52) U.S. Cl.
CPC ........... *B01J 21/063* (2013.01); *B01J 35/004* (2013.01); *B01J 37/0219* (2013.01);
(Continued)

(58) Field of Classification Search
CPC .................................................. B01J 21/063
See application file for complete search history.

(56) References Cited

U.S. PATENT DOCUMENTS 8,193,262 B2 * 6/2012 Serre ............... C04B 26/02
524/12
2005/0277543 A1 * 12/2005 Takahashi ........... C09D 5/1625
502/100

(Continued)

FOREIGN PATENT DOCUMENTS

CN 101423690 A * 5/2009

OTHER PUBLICATIONS

Enlgish translation of CN101423690, dated May 2009.*

*Primary Examiner* — Melvin C Mayes
*Assistant Examiner* — Stefanie Cohen
(74) *Attorney, Agent, or Firm* — Carrier Blackman & Associates, P.C.; Joseph P. Carrier; William D. Blackman

(57) ABSTRACT

Provided by the present invention is a photocatalytic coating composition which can express excellent visibility during application work and further can, owing to its excellent physical properties, form a homogeneous photocatalyst coated film having uniform thickness on a surface of a substrate. The photocatalytic coating composition which is basic and comprises photocatalyst particles, a basic dye, a layered silicate, and a dispersion medium. The basic dye enhances visibility of the part where the photocatalytic coating composition is applied so that the applied part can be easily distinguished from the unapplied part by the difference in appearance. After application work, color of the basic dye disappears by photolysis with a solar light or by decomposition with a photocatalyst. The layered silicate suppresses color change of the basic dye over time and stably keep color tone of the same.

11 Claims, 1 Drawing Sheet

(30) Foreign Application Priority Data

Sep. 30, 2015 (JP) .................................. 2015-193891
Sep. 30, 2015 (JP) .................................. 2015-193892

(51) Int. Cl.
*B01J 35/00* (2006.01)
*B01J 37/02* (2006.01)
*C09D 5/16* (2006.01)
*C09D 7/12* (2006.01)
*C08K 3/36* (2006.01)
*C08K 3/22* (2006.01)

(52) U.S. Cl.
CPC ......... *C09D 5/1618* (2013.01); *C09D 5/1687* (2013.01); *C09D 5/1693* (2013.01); *C09D 7/1233* (2013.01); *C08K 3/36* (2013.01); *C08K 2003/2241* (2013.01); *C08K 2003/2244* (2013.01)

(56) References Cited

U.S. PATENT DOCUMENTS

| 2007/0167551 A1* | 7/2007 | Goodwin | C08K 3/0033 |
| | | | 524/442 |
| 2011/0236284 A1* | 9/2011 | Hayakawa | C09D 7/1266 |
| | | | 423/239.1 |

* cited by examiner

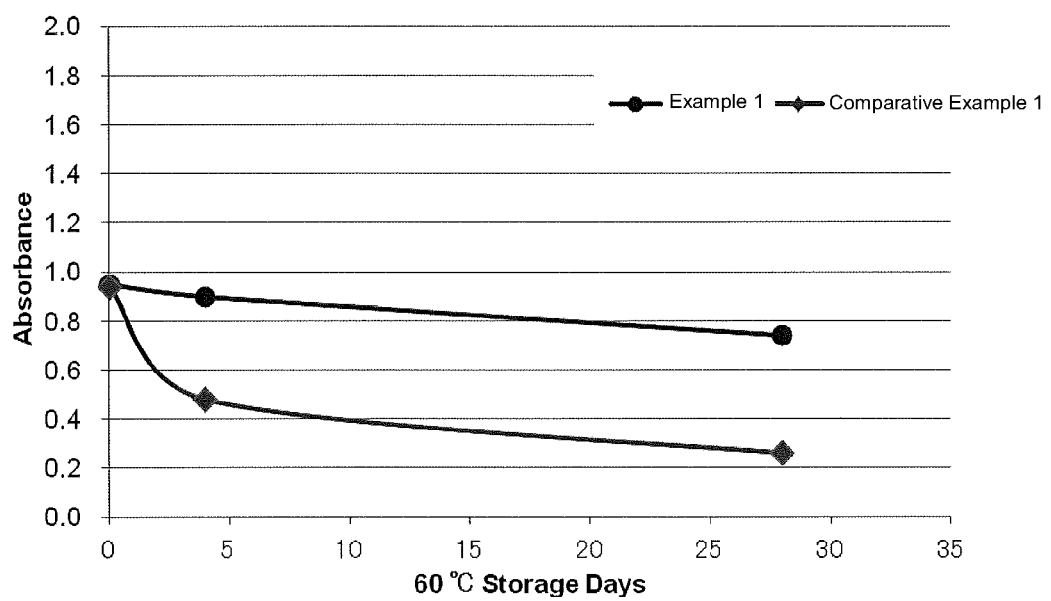

PHOTOCATALYTIC COATING COMPOSITION

FIELD OF INVENTION

The present invention relates to a photocatalytic coating composition having, owing to its excellent visibility and physical properties, a good application workability so that a homogeneous photocatalyst coated film having uniform thickness can be stably formed on a surface of a base.

BACKGROUND ART

In recent years, a photocatalyst such as titanium oxide has been used in many use applications including an exterior material of an architectural structure. A photocatalyst excited by a light can decompose various harmful substances, and utilizing this property allows a surface of a base coated with a photocatalyst to be cleaned. In addition, a photocatalyst which is excited by a light makes a surface of a base coated with the photocatalyst hydrophilic, and the hydrophilic properties thus imparted allow a dirt which is attached to the surface to be easily washed out by water. It is widely known that the photocatalyst coated film like this is formed by applying a coating solution which contains a photocatalyst. Besides, a photocatalyst coated film mainly used is transparent so as not to damage the design of a base such as an exterior material.

A technology in which hydrophilicity is given to a surface of a glass, a mirror, or the like by using, as a coating solution which contains a photocatalyst, an aqueous dispersion which contains photocatalyst particles and an inorganic binder has been known (see, for example, PTL 1: JP 2001-89706 A). In the technology described in PTL 1, a transparent coated film is obtained by highly dispersing fine photocatalyst particles and an inorganic binder such as an alkaline silicate salt. PTL 1 also discloses that in order to suppress uneven coating of the coating solution so that the coated film may have a uniform film thickness, the coating solution is impregnated into an unwoven cloth and is applied to a base by sliding it to one direction at a constant speed. Namely, in this technology, a worker involved in application has been required to have a high skill.

In order to form a satisfactory photocatalyst coated film without requiring a high skill to a worker, various ingenuities have been exercised. For example, as to an apparatus or a tool for assisting the application work, in JP 2003-026447 A (PTL 2), a method in which application is conducted while a roller is in the fixed state is proposed; and in JP 2010-247054 A (PTL 3), it is proposed that a laser irradiation means and a metronome are combined with a spraying apparatus.

Also, with regard to improvement of a composition of a coating solution focusing on rheology, for example, it is proposed in PTL 1 that a surfactant or a thickener is added to a dispersion in order to control viscosity of the dispersion. It is proposed in JP 2004-143443 A (PTL 4) that a thickener is used and that a surfactant and a solvent having a high boiling point are added.

However, even with these technologies, the status quo is that a high skill is required to a worker involved in application especially when a coating solution is applied on the spot to a large area such as a wall surface. In order to form a satisfactory photocatalyst coated film without requiring the special skill as mentioned above, further improvement of the coating solution is necessary.

It is proposed that, in WO 2000-33977 A (PTL 5), an organic colorant is added to a photocatalytic coating composition to improve visibility of the composition so that a formation of a photocatalyst coated film may be confirmed. According to the PTL 5, it is described that the color of the organic colorant disappears after application by photocatalytic action.

CITATION LIST

Patent Literature

PTL 1: JP 2001-089706 A
PTL 2: JP 2003-026447 A
PTL 3: JP 2010-247054 A
PTL 4: JP 2004-143443 A
PTL 5: WO 2000-33977 A

SUMMARY OF THE INVENTION

The present inventors have now found that when a certain dye and a certain clay-type stabilizer are added, a photocatalytic coating composition which can express excellent visibility during application work can be realized. The present invention has been made on the basis of such findings.

Therefore, the present invention has an object to provide a photocatalytic coating composition which can express excellent visibility during application work.

That is, the photocatalytic coating composition according to the present invention comprises photocatalyst particles, a dispersion medium, a layered silicate, and a basic dye, wherein liquid property of the photocatalytic coating composition is basic.

The photocatalytic coating composition according to the present invention expresses excellent visibility during application work. In addition, the photocatalytic coating composition according to the present invention has small temperature dependency in its viscosity and excellent storage stability for a long period of time with a small viscosity change rate. In addition, regardless of kind of the base, a homogeneous photocatalyst coated film having uniform thickness can be formed on a surface of a base without applying in a skilled working method in which a conventional application tool is used or without using a special application apparatus. In particular, even when on-site application is made to an area larger than a window or the like, such as a wall surface, without any need for a special application skill or technique, a satisfactory photocatalyst coated film can be easily formed without causing liquid dripping due to excess application or poor appearance such as uneven coating and coating streaks. In addition, excellent application workability or easiness as mentioned above can be kept stably for a long period of time.

BRIEF DESCRIPTION OF THE DRAWINGS

FIG. 1 shows the change of the absorbance in each of the photocatalytic coating compositions of Example 1 and Comparative Example 1 over time.

DESCRIPTION OF THE INVENTION

Basic Dye

The photocatalytic coating composition according to the present invention comprises a basic dye. When a basic dye is added, visibility of the part where the photocatalytic coating composition is applied can be enhanced so that the applied part can be easily distinguished from the unapplied part by the difference in appearance, and as a result, the application workability improves. The basic dye is an organic colorant which is visible during application work while the color of which disappears in the end by photolysis with a solar light or decomposition with a photocatalyst. In addition, the basic dye is soluble in water and has a high coloring property even in a small amount, whereas it has low light fastness. Thus, the basic dye has properties that while the visibility of the dye is initially high the color imparted to the coating composition by the dye readily disappears when a photocatalytic film formed with the coating composition is exposed to light. Examples of the basic dye preferably include auramine, malachite green and methylene blue.

Addition amount of the basic dye may be properly determined within the purpose that the color of the colorant is visible during application work and disappears in the end. Addition amount of the basic dye is preferably, for example, in the range of 0.001% or more by mass to 0.05% or less by mass, more preferably in the range of 0.005% or more by mass to 0.01% or less by mass.

Clay-Type Stabilizer (Layered Silicate)

The above-mentioned basic dye which is contained in the coating composition according to the present invention can be dispersed in the basic photocatalytic coating composition but has a tendency to change its color by chemical change during storage. As a result, there is a risk that the visible period may be restricted during application work. A clay-type stabilizer such as a layered silicate suppresses color change of the basic dye over time, so that an initial color tone can be kept stably. The reason for this is considered that the basic dye molecule showing a cationic character is intercalated between layers of the layered silicate by its cation exchange capacity so that it is stabilized or protected in the basic photocatalytic coating composition. As a result, the photocatalytic coating composition according to the present invention can ensure a proper visible period while expressing excellent visibility during application work. According to a preferred embodiment of the present invention, the layered silicate which stabilizes the basic dye is used in combination with a thickener, which is described later, such as a polysaccharide thickener which contains glucuronic acid and/or rhamnose in its main chain. By virtue of this, color stability and dispersibility of the basic dye as well as viscosity stability (storage stability) of the photocatalytic coating composition can be more enhanced.

The layered silicate is preferably in a bared state without the treatment of hydrophobization. Examples of the layered silicate preferably include synthetic hectorite (commercial names: Laponite RD and Laponite B, manufactured by BYK Japan KK) and synthetic saponite (commercial name: Lucentite, manufactured by Co-op Chemical Co., Ltd.; and Sumecton SA, manufactured by Kunimine Industries Co., Ltd.). Any of natural and synthetic layered silicates may be used, among them, synthetic layered silicates are more preferable because they are colorless.

Thickener

In the present invention, a thickener means a substance which is added to control rheology and increases the viscosity of the photocatalytic coating composition. The photocatalytic coating composition according to the present invention is a basic aqueous dispersion with low solid content, and therefore, it is required that the thickener preferably has the following characteristics: the thickener has a high water solubility; the thickener can thicken the composition with a small quantity; the thickener has a thickening property which is not damaged in basic and high temperature conditions; the thickener has color which is not left during drying.

In the present invention, as the thickener which shows the above-mentioned characteristics, at least one selected from the group consisting of a polysaccharide thickener containing glucuronic acid and/or rhamnose in its main chain and a layered silicate may be preferably used. That is, the layered silicate as the thickener as well as the layered silicate as the stabilizer can be separately added to the photocatalytic coating composition according to the present invention. Examples of the polysaccharide thickener containing glucuronic acid and/or rhamnose in its main chain include Diutan gum and/or Welan gum. The layered silicate which is described before as the clay-type stabilizer may be also used as the layered silicate which is described as the thickner. The thickener changes rheology of the photocatalytic coating composition thereby contributing to make the application work of the composition remarkably easy. In addition, the thickener can express a significant thickening effect even in a small addition amount and can form a transparent photocatalyst coated film, therefore, they are preferable. Furthermore, the thickener has a small temperature dependency in viscosity change, and therefore, for example, when the application work of the photocatalytic coating composition is done outdoor, a constant rheology property can be obtained regardless of the outdoor temperature, so that variability in application work due to environmental factors can be suppressed. When the layered silicate is used as the thickener, the photocatalytic coating composition further contains the layered silicate used as the thickener in addition to the layered silicate used as the stabilizer.

Addition amount of the thickener to the photocatalytic coating composition is preferably in the range of 0.05% or more by mass to 1% or less by mass, while more preferably in the range of 0.1% or more by mass to 0.8% or less by mass. By virtue of this, there is no liquid dripping or the like during the application work to a large area such as an exterior wall, so that the photocatalytic coating composition can be applied with a simple application tool to form a homogeneous coated film.

Photocatalyst Particles

In the present invention, photocatalyst particles mean particles having a photocatalytic activity. Specifically, photocatalyst particles may be particles which generate active oxygen species ($.O_2^-$, $.O^-$, $.OH$, $H_2O_2$, $.HO_2$, and the like) to decompose an organic substance by a photocatalytic reaction which takes place by irradiation of a light, especially a UV light or a visible light, or which generates a positive hole, i.e., hole in the valence band by photoexcitation which takes place by irradiation of a UV light or a visible light.

Examples of the photocatalyst particles like this include metal oxide semiconductors showing a photoresponsive property such as titanium oxide, zinc oxide, tin oxide, niobium oxide, strontium titanate, bismuth vanadate and tungsten oxide. When at least one photocatalyst particle selected from the group consisting of the metal oxide semiconductors is used, a photocatalyst coated film having an excellent photocatalytic activity such as an antibacterial activity and an antivirus activity and also having a high hydrophilifiability can be obtained. Preferable photocatalyst particles are titanium oxides.

Titanium oxide may be any of an amorphous titanium oxide and a crystalline-type titanium oxide. A preferable titanium oxide is a crystalline-type titanium oxide. Examples of the crystalline-type titanium oxide preferably include at least one titanium oxide selected from the group consisting of an anatase-type titanium oxide, a rutile-type titanium oxide and a brookite-type titanium oxide. Among them, an anatase-type titanium oxide has a high photocatalytic activity and a high hydrophilifiability, so that it is more preferable. In addition, titanium oxides may also be used as photocatalyst particles having an enhanced photoresponsibility to a visible light by doping with an element such as nitrogen or by supporting a copper compound or an iron compound on a surface thereof.

In the present invention, titanium oxide may be used in any form of a sol and a particle.

Titanium oxide in the form of a sol may be obtained, for example, by liquid phase method, that is, a method in which a solution dissolved titanium oxide raw material therein is hydrolyzed or neutralized to obtain titanium oxide, by using titanium chloride or titanyl sulfate as a raw material. The titanium oxide obtained by liquid phase method tends to have low crystallinity of rutile and large specific surface area. In this case, the titanium oxide may be fired or the like to obtain a titanium oxide having optimum crystallinity and specific surface area. A solvent usable may be but is not particularly limited to water, alcohols, ketones, and a mixture thereof. Examples of the alcohols include methanol, ethanol, 1-propanol, 2-propanol, 1-butanol, and a mixture thereof. Examples of the ketones include acetone, acetylacetone, methyl ethyl ketone, and a mixture thereof.

Titanium oxide in the form of particle may be obtained, for example, by gas phase method, that is, a method in which titanium oxide is obtained by gas phase reaction of titanium tetrachloride with oxygen, by using titanium tetrachloride as a raw material. The titanium oxide obtained by gas phase method has uniform average particle diameter. The titanium oxide also has high crystallinity because it is produced via a high temperature process. As a result, the titanium oxide obtained provides the photocatalytic coating composition with good antibacterial activity and antivirus activity in both a bright place and a dark place as well as with good decomposition property of an organic compound.

Particle diameter of the photocatalyst particle is preferably in the range of 1 nm or more to 50 nm or less, while more preferably in the range of 5 nm or more to 20 nm or less. When the particle diameter is preferably 1 nm or more while more preferably 5 nm or more, photocatalytic activity and hydrophilization performance thereof can be satisfactorily expressed. When the particle diameter is preferably 50 nm or less while more preferably 20 nm or less, scattering of a visible light does not readily take place, so that the photocatalyst coated film having excellent transparency can be obtained. Here, the particle diameter is calculated as a number average value of the measured lengths of 100 particles in a fracture cross section of the photocatalyst coated film which is obtained by the method as mentioned later, each of the particles being observed by a scanning electron microscope at a magnification of 200,000 times. If the shape of the observed particle is almost circle, the length of the particle means a diameter of the particle. If the shape of the observed particle is non-circular, the length of the particle is calculated as an approximate value of (major axis+minor axis)/2.

Addition amount of the photocatalyst particles in the photocatalytic coating composition is preferably in the range of 0.05% or more by mass to 5% or less by mass, while more preferably in the range of 0.1% or more by mass to 1% or less by mass. When the photocatalyst particles are contained within this range, the photocatalytic activity and the hydrophilization performance can be satisfactorily expressed, and further, the photocatalyst coated film can be prevented from becoming too thick.

Primary to Tertiary Alkanol Amines

According to a preferred embodiment of the present invention, the photocatalytic coating composition further comprises at least one selected from the group consisting of primary to tertiary alkanol amines. Primary to tertiary alkanol amines have an effect to stabilize the particle components such as the photocatalyst particles; the layered silicates; and the thickeners such as and the polysaccharide thickeners containing glucuronic acid and/or rhamnose in its main chain, in the photocatalytic coating composition. That is, the alkanol amines are added to suppress a reaction or an agglomeration of particle components such as the photocatalyst particles and later-mentioned inorganic oxides, and further not to inhibit the composition thickening due to formation of a network by way of the thickener. By virtue of this, the photocatalytic coating composition having excellent storage stability for a long period of time can be obtained.

When the liquid property of the photocatalytic coating composition is basic, in the photocatalytic coating composition, all the particle components are dispersed or dissolved with carrying negative charge. If the thickener is added in order to improve application workability, charge balance of the photocatalytic coating composition is lost, so that there is a possibility that viscosity of the photocatalytic coating composition becomes unstable. So as to stabilize the particle components and the thickener in the photocatalytic coating composition, it is considered necessary to stabilize the charge of the composition and to stabilize solubility of the thickener into the composition. Addition of primary to tertiary alkanol amines has an effect to stabilize both of them. That is, it is considered that primary to tertiary alkanol amines can stabilize an electric charge and also can maintain the solubility of the thickener since they have a nitrogen in the form of an amine which readily coordinate with the thickener, and at the same time have an alkanol group.

In substitution for primary to tertiary alkanol amines, sodium hydroxide or ammonia may be added. In this case, the photocatalytic coating composition can be stabilized at a certain viscosity by stabilizing an electric charge of the composition. On the other hand, primary to tertiary alkanol amines further have an effect to enhance hydrophilicity of the thickener, the alkanol amines can give a stability for a long period of time to the photocatalytic coating composition, so that sodium hydroxide and/or ammonia may be further added to primary to tertiary alkanol amines.

In addition, in substitution for primary to tertiary alkanol amines, an alkyl amine may be added. In this case, it has an effect to stabilize an electric charge of the photocatalytic coating composition and readily coordinate with the thickener as well as primary to tertiary alkanol amines. On the other hand, primary to tertiary alkanol amines further have an effect to facilitate hydration of the thickener, the alkanol amines can enhance stability of the viscosity of the photocatalytic coating composition, so that an alkyl amine may be further added to primary to tertiary alkanol amines.

Preferable examples of primary to tertiary alkanol amines include dimethyl ethanol amine, methyl diethanol amine, ethanol amine, diethanol amine, triethanol amine, diethyl ethanol amine, dibutyl ethanol amine, β-aminoethyl ethanol amine, methyl ethanol amine, ethyl ethanol amine, ethyl diethanol amine, n-butyl ethanol amine, n-butyl diethanol amine, t-butyl ethanol amine, t-butyl diethnaol amine, β-aminoethyl isopropanol amine and diethyl isopropanol amine and the like. Among them, dimethyl ethanol amine and methyl diethanol amine are more preferable.

Primary to tertiary alkanol amines are preferably added such that the ratio of the mass of the primary to tertiary alkanol amines relative to the mass of total solid content in the photocatalytic coating composition may be in the range of 2.5% or more by mass to 25% or less by mass. When the addition amount of the primary to tertiary alkanol amines is adjusted to 2.5% or more by mass, the photocatalytic coating composition having a small viscosity change rate and an excellent storage stability can be obtained. In addition, liquid dripping during application work can be effectively prevented. When the addition amount of the primary to tertiary alkanol amines is adjusted to 25% or less by mass, the amount of non-particle components in the photocatalytic coating composition can be lowered, so that the photocatalyst coated film can have sufficient strength. In addition, the photocatalyst coated film can have good weather fastness. When the primary to tertiary alkanol amines are contained such that the liquid property of the photocatalytic coating composition may be adjusted to basic, preferably to pH of 8.0 or more to 12.0 or less, dispersion stability and viscosity stability of the photocatalytic coating composition can be more enhanced. In the present invention, if primary to tertiary alkanol amines are contained in various raw materials of the photocatalytic coating composition (for example, primary to tertiary alkanol amines contained in a zirconia sol), the addition amount of the primary to tertiary alkanol amines means the total amount including the amount of the primary to tertiary alkanol amines contained in the raw materials.

Dispersion Medium

The photocatalytic coating composition according to the present invention comprises a dispersion medium. According to a preferred embodiment of the present invention, the dispersion medium mainly contains water. "A dispersion medium mainly containing water" is what contains water in the range of 60 parts or more by mass to 100 parts or less by mass, while preferably in the range of 80 parts or more by mass to 100 parts or less by mass, in 100 parts by mass of the dispersion medium. When a mixed solvent containing a mixture of water and an organic solvent other than water is used, the organic solvent is preferably what is soluble in water.

Examples of the water-soluble organic solvent preferably include methanol, ethanol, 1-propanol, 2-propanol, 1-butanol, 2-butanol, t-butanol, pentanol, hexanol, cyclobutanol, cyclopentanol, cyclohexanol, ethylene glycol, propylene glycol, glycerin, methyl cellosolve and ethyl cellosolve. In the present invention, at least one organic solvent selected from the group consisting of the above compounds may be used.

Preferably, the photocatalytic coating composition according to the present invention contains the dispersion medium such that total solid content contained in the composition is adjusted to 0.1% or more by mass to 10% or less by mass. When the dispersion medium is contained within this range, the photocatalyst coated film which is transparent and has excellent appearance can be obtained.

Inorganic Compound

According to a preferred embodiment of the present invention, the photocatalytic coating composition according to the present invention comprises an inorganic compound. In the present invention, an inorganic compound means inorganic compounds other than the photocatalyst particle as mentioned above. Examples of the inorganic compound preferably include fine particles of an inorganic oxide and/or an inorganic hydroxide. Containing these fine particles, the photocatalytic coating composition can have excellent stability and enhance harmful substances removing capacity of the photocatalyst coated film. Examples of the inorganic oxide and/or inorganic hydroxide preferably include at least one compound selected from the group consisting of silica, zirconia, zirconium hydroxide, a water-soluble zirconium compound, alumina, hafnia and ceria. At least one compound selected from the group consisting of silica, zirconia, zirconium hydroxide and a water-soluble zirconium compound is more preferable. When these compounds are contained, the photocatalyst coated film can obtain excellent film performance, namely, strength, transparency, and harmful substances removing capacity. Because silica is excellent as a binder, adhesion of the photocatalyst coated film to a base is strong, so that silica is especially preferable. Because at least one compound selected from the group consisting of zirconia, zirconium hydroxide and a water-soluble zirconium compound has high removing capacity of harmful substances such as NOx, so that the above compounds are preferable. By virtue of this, the photocatalyst coated film having excellent transparency can be obtained. In the present invention, inorganic compounds can be used in both a sol form and a particle form. In order to obtain the photocatalyst coated film having high transparency, inorganic compounds in the form of a sol are preferably used.

Particle diameter of the inorganic compound is preferably 50 nm or less. When the particle diameter is within this range, scattering of a visible light does not readily take place, so that the photocatalyst coated film having excellent transparency can be obtained. In addition, when the particle diameter is 20 nm or less, an effect as a binder becomes higher so that the photocatalyst coated film can have excellent adhesion. Here, the particle diameter is calculated as a number average value of the measured lengths of 100 particles in a fracture cross section of the photocatalyst coated film which is obtained by the method as mentioned later, each of the particles being observed by a scanning electron microscope at a magnification of 200,000 times. If the shape of the observed particle is almost circle, the length of the particle means a diameter of the particle. If the shape of the observed particle is non-circular, the length of the particle is calculated as an approximate value of (major axis+minor axis)/2.

Addition amount of the inorganic compound in the photocatalytic coating composition is preferably in the range of 0.05% or more by mass to 9.9% or less by mass, while more preferably in the range of 0.1% or more by mass to 8% or less by mass. When the inorganic compound is contained within this range, an effect as a binder can be satisfactorily expressed, and further, the photocatalyst coated film can be prevented from becoming too thick, so that excellent transparency can be obtained.

Binder

According to a preferred embodiment of the present invention, the photocatalytic coating composition according to the present invention comprises a binder. A binder allows solid components such as the photocatalyst particles and the inorganic compound to fix to a surface of a base. As the binder, any of an organic binder and an inorganic binder can be used. Examples of the inorganic binder include hydrolysable silane compounds such as ethyl silicate and methyl ethyl silicate; alkaline silicate such as lithium silicate and potassium silicate; metal oxide precursors such as zirconium hydroxide; and amorphous metal oxides. Examples of the organic binder include a polymer binder. The polymer binder is polymerized to form a thin film, or alternatively, polymer dispersoids are fused by evaporation of the dispersion medium to form a thin film.

As the polymer binder, any of a natural resin and a synthetic resin can be used. Examples of the synthetic resin include an acryl resin, a hydrolysable silicone, an acryl silicone resin, a silicone resin, an epoxy resin, a urethane resin, a phenol resin, a polyurethane resin, an acrylonitrile/styrene copolymer resin, an acrylonitrile/butadiene/styrene copolymer (ABS) resin, a polyester resin and a fluorine resin. These resins which are silicone-modified or halogen-modified may be used as well. Among them, at least one resin selected from a silicone resin, a silicone-modified resin and a fluorine resin can be preferably used as the binder. According to a more preferred embodiment of the present invention, the binder is blended in a form of a dispersion such as emulsion and dispersion of these resins and is present in an aqueous coating composition.

Addition amount of the binder may be properly determined, the amount is usually in the range of about 10% or more by mass to about 65% or less by mass, preferably 20% or more by mass, more preferably 30% or more by mass, and preferably 55% or less by mass, more preferably 45% or less by mass, relative to total mass of solid components in the aqueous coating composition. When the amount of the binder is within the range like this, the photocatalyst particles can be desirably exposed while keeping mechanical strength of the photocatalyst coated film, so that excellent photocatalytic activity can be expressed. When the binder is contained, the photocatalyst coated film having excellent adhesion can be obtained.

Other Additives

Surfactant

In the present invention, the photocatalytic coating composition may contain a surfactant. When a surfactant is contained, the surface tension of the photocatalytic coating composition is lowered so that the composition having excellent leveling property during a coated film is formed can be obtained. In addition, due to the action of the surfactant, evaporation of the dispersion medium becomes uniform, so that thickness of the photocatalyst coated film can be made uniform. The surfactant is preferably a substance which has high solubility into water contained in the dispersion medium as a main component and has a high effect to lower the surface tension. Examples of the surfactant like this include a nonionic surfactant, an ether-type nonionic surfactant, an ester-type nonionic surfactant, a polyalkylene glycol-type nonionic surfactant, a fluorine-type nonionic surfactant, a silicon-type nonionic surfactant, an olefin-type surfactant, an acetylenediol-type surfactant, and a polyether-modified silicone-type surfactant. When these surfactants are added in an amount of preferably 0.01% or more by mass to 0.5% or less by mass, the surface tension of the composition can be satisfactorily lowered so that the uniform photocatalyst coated film having high transparency can be obtained.

Defoamer

In the present invention, the photocatalytic coating composition may contain a defoamer. When a defoamer is contained, foaming or generation of air bubbles during application of the composition can be suppressed. Examples of the defoamer preferably include a silicone-type defoamer having a high safety.

Pigment

In the present invention, the photocatalytic coating composition may contain a pigment in such an addition amount that the effects of the present invention are not damaged. As the pigment, at least one selected from the group consisting of a coloring pigment, an extender pigment, and a functional pigment may be used. When the pigment is contained, the photocatalyst coated film can be provided with a concealing property, and the coated film which can keep coloration for a long period of time can be formed, or alternatively, when the functional pigment is used, for example, a functional coated film having a reflective property of an infrared beam may be formed.

Total Solid Content Concentration

According to a preferred embodiment of the present invention, the ratio of the mass of total solid content in the photocatalytic coating composition relative to the mass of the entire photocatalytic coating composition is in the range of 0.1% or more by mass to 10% or less by mass. When the mass ratio of total solid content is within this range, a transparent photocatalyst coated film can be obtained. When the mass ratio of total solid content is 0.1% or more by mass, desirable appealing performances such as photocatalytic activity, for example, self-cleaning (anti-fouling) property, harmful gases decomposing property and antibacterial and antivirus properties, can be obtained. When the mass ratio of total solid content is 10% or less by mass, the photocatalyst coated film having excellent appearance can be obtained. In the present invention, total solid content concentration in the photocatalytic coating composition means the ratio of the mass of total solid content (namely, components for forming the coated film) contained in the photocatalyst coated film, which is formed by applying the photocatalytic coating composition to a base to form a coated film, followed by drying the coated film at the temperature of 105° C. or higher to 110° C. or lower, relative to the mass of the entire photocatalytic coating composition.

Liquid Property

Liquid property of the photocatalytic coating composition according to the present invention is basic. By virtue of this, the photocatalytic coating composition having excellent dispersion stability and viscosity stability can be obtained. According to a preferred embodiment of the present invention, the photocatalytic coating composition has pH of 8.0 or more to 12.0 or less. When pH is 12.0 or less, the safety of the composition can be ensured. The component for adjusting the liquid property of the photocatalytic coating composition to basic is preferably but not particularly limited to primary to tertiary alkanol amines.

Method for Producing the Photocatalytic Coating Composition

The photocatalytic coating composition of the present invention is prepared by mixing the above-mentioned components in such an addition amount that predetermined addition amounts of the components may be attained. Raw material of each particle component is preferably in the form of a sol. By virtue of this, the particle diameter of each particle component can be made small. The sol is preferably basic or neutral.

Photocatalytic Body

The photocatalytic coating composition of the present invention is applied to a surface of a base to form the photocatalyst coated film. In this way, a photocatalytic body comprising at least the base and the photocatalyst coated film formed on the surface of the base is obtained.

Base

A base to which the photocatalytic coating composition according to the present invention is applied may be a material, on a surface of which the photocatalyst coated film can be formed. The base may be various materials regardless of an inorganic material and an organic material. Examples of the base include a single base composed of general members, for example, ceramic-based inorganic materials such as fiber-reinforced cement board, plaster board, concrete member, wall paper, fiber, metal, ceramic, glass and tile; and resin materials such as PMMA and polycarbonate; as well as a composite base composed of two or more of the above members. Alternatively, a base having an organic coating or the like treated on the surface thereof may be used.

Pretreatment of Base

In the present invention, it is preferable to ensure a wetting property of the surface of the base by pretreating the base. By virtue of this, a uniform photocatalyst coated film can be formed. Means to ensure the wetting property preferably include a cleaning agent containing a surfactant and cleaning with abrasives or the like such as cerium oxide powders. An organic coating may be conducted on the surface of the pretreated base.

Application to Base

Application of the photocatalytic coating composition to the base may be done by an application method widely and generally used in on-site application such as brush coating, roller coating, spray coating, and coating using a sponge, an unwoven cloth, a paint pad and the like.

Preferably, the application amount of the photocatalytic coating composition of the present invention is controlled such that thickness of the photocatalyst coated film after drying is about 1 μm, although the application amount depends on concentrations of the solid components and the binder contained in the photocatalytic coating composition. When the film thickness in this range is ensured, sufficient photocatalytic activity and hydrophilifiability can be obtained.

Formation of Photocatalyst Coated Film

After the photocatalytic coating composition of the present invention is applied to the base, a wet film formed of the photocatalytic coating composition which spreads in a wet state on the surface of the base is dried to form the photocatalyst coated film. The wet film may be dried at normal temperature. The wet film may be, if necessary, dried by heating. The drying temperature is preferably in the range of 5° C. or higher to 500° C. or lower. When a polymer binder is used as the binder or when a resin component is contained in at least part of the base, the wet film may be dried, for example, at temperature in the range of 10° C. or higher to 200° C. or lower, taking the heat-resistant temperature of the binder or the resin component into consideration.

Photocatalyst Coated Film

The thickness of the photocatalyst coated film is preferably in the range of 0.5 μm or more to 5 μm or less. When the film thickness is 0.5 μm or more, an excellent performance can be obtained. When the film thickness is 5 μm or less, generation of cracks can be prevented, so that excellent appearance can be obtained.

EXAMPLES

Kind of the Polysaccharide Thickeners and Viscosity Change

Reference Examples 1 to 6

Firstly, test was carried out to study the relationship between kind of thickeners and viscosity change. As the thickeners, Diutan gum and Welan gum which contain glucuronic acid and rhamnose in their main chains; xanthan gum which does not contain neither glucuronic acid nor rhamnose in its main chain but contains glucuronic acid in its side chain; guar gum which does not contain neither glucuronic acid nor rhamnose in its main chain and in its side chain; sodium carboxymethyl cellulose; and hydroxyethyl cellulose were used. These thickeners each were added to ion-exchanged water with the ratio shown in Table 1, and the resulting mixture was stirred well to prepare aqueous solutions 1 to 6 of Reference Examples 1 to 6. The viscosity changes of these aqueous solutions 1 to 6 were measured.

<Viscosity Change>

The aqueous solutions 1 to 6 were stored in a constant temperature bath at 60° C., and 1 week later, viscosities of the aqueous solutions 1 to 6 (6 rpm at 25° C.) were measured with a Brookfield viscometer (manufactured by Toki Sangyo Co., Ltd., TV-10, spindle M2) to obtain the change rates relative to the initial viscosities. The measurement conditions of the Brookfield viscometer were that the rotation speed of a rotor was 6 rpm and the measurement temperature was 25° C. As to the rotor, a M2 rotor was used. As shown in Table 1, in Reference Examples 1 and 2 in which Diutan gum or Welan gum containing glucuronic acid and rhamnose in their main chains was used, there were substantially no viscosity changes after 1 week. On the other hand, in Reference Example 3 in which xanthan gum containing glucuronic acid in its side chain was used, the viscosity of the aqueous solution decreased after 1 week. Also in Reference Examples 4 to 6 in which thickeners were used which do not contain neither gluconic acid nor rhamnose in their main chains and side chains, the viscosity of the aqueous solutions decreased after 1 week. The viscosity change rate was calculated by dividing the value obtained by subtracting the initial viscosity from the viscosity after 1 week by the value of the initial viscosity (unit: %). The evaluation criteria were as follows: when the viscosity change rate was in the range of +15% to −10%, the result was judged to be OK, while the rate was outside the above range, the result was judged to be NG.

Therefore, in the tests regarding the photocatalytic coating composition described later, polysaccharide thickeners containing gluconic acid and/or rhamnose in their main chains were used as the thickener.

TABLE 1

| | Thickener | | Total solid content | Viscosity (6 rpm, 25° C.) mPa · s | | | |
|---|---|---|---|---|---|---|---|
| | Kind | % by mass | concentration (% by mass) | Initial | 60° C., after 1 week | Viscosity change rate | OK or NG |
| Reference Example 1 | Diutan gum | 0.1 | 0.1 | 543 | 541 | −0.40% | OK |
| Reference Example 2 | Welan gum | 0.15 | 0.15 | 283 | 265 | −6.40% | OK |
| Reference Example 3 | Xanthan gum | 0.3 | 0.3 | 237 | 50 (10 days) | −78.90% | NG |

TABLE 1-continued

|  | Thickener | | Total solid content | Viscosity (6 rpm, 25° C.) mPa · s | | | |
| --- | --- | --- | --- | --- | --- | --- | --- |
|  | Kind | % by mass | concentration (% by mass) | Initial | 60° C., after 1 week | Viscosity change rate | OK or NG |
| Reference Example 4 | Guar gum | 0.4 | 0.4 | 176 | 105 | −40.3% | NG |
| Reference Example 5 | Sodium carboxymethyl cellulose | 0.2 | 0.2 | 214 | 56 | −73.8% | NG |
| Reference Example 6 | Hydroxyethyl cellulose | 1 | 1 | 223 | 121 | −45.7% | NG |

Preparation of Photocatalytic Coating Compositions:

Examples 1 to 11 and Comparative Examples 1 to 4

In Examples 1 to 11, predetermined amount of synthetic layered silicate was added as the stabilizer to ion-exchanged water, and then, the resulting mixture was stirred well. Synthetic hectorite was used in Examples 1 to 10, and synthetic saponite was used in Example 11. Next, an aqueous solution of 1% methylene blue previously prepared was added little by little. An aqueous dispersion of anatase-type titanium oxide was provided as the photocatalyst particle. Water dispersion-type colloidal silica and zirconia sol were provided as the inorganic compounds. Next, the photocatalyst particle and the inorganic compounds were added so that the weight ratio of the aqueous dispersion of anatase-type titanium oxide/water dispersion-type colloidal silica/zirconia sol is a predetermined mass ratio. However, in Examples 4 and 9, inorganic compounds were not added. Next, predetermined amount of the polysaccharide thickener was added. However, in Examples 4, 5, and 9, the polysaccharide thickener was not added. Next, if necessary, one or two selected from the group consisting of an alkanol amine, a defoamer and a surfactant were added in this order. In this way, the photocatalytic coating composition was obtained. Addition amounts of each component were properly adjusted such that the total solid content concentration is predetermined value. Here, the total solid content concentration means total concentration of the photocatalyst particle, the inorganic compounds, solid component of the basic dye, solid component of the layered silicate, solid component of the polysaccharide thickener, solid component of the defoamer and solid component of the surfactant, relative to the entire photocatalytic coating composition. In Comparative Example 1, the photocatalytic coating composition was obtained in the same manner as in Examples 1 to 11 except that the stabilizer was not used. In Comparative Example 2, the photocatalytic coating composition was obtained in the same manner as in Examples 1 to 11 except that layered silica was used as the stabilizer. In Comparative Example 3, the photocatalytic coating composition was obtained in the same manner as in Examples 1 to 11 except that a phosphate ester type anionic surfactant was used as the stabilizer. In Comparative Example 4, the photocatalytic coating composition was obtained in the same manner as in Examples 1 to 11 except that a self-emulsification type anionic resin having a carboxyl group was used as the stabilizer. Kinds of each component and the addition amount thereof are shown in Table 2.

TABLE 2

|  | Stabilizer (Layered silicate) | Basic dye Methylene blue | Photocatalyst particle | Inorganic compound | | Polysaccharide thickener | |
| --- | --- | --- | --- | --- | --- | --- | --- |
|  |  |  |  | SiO2 | ZrO2 |  |  |
|  | (% by mass) | (% by mass) | TiO2 (% by mass) | (% by mass) | (% by mass) | Kind | % by mass |
| Example 1 | 0.04 | 0.01 | 0.105 | 2.595 | 0.3 | Diutan gum | 0.1 |
| Example 2 | 0.02 | 0.005 | 0.105 | 2.595 | 0.3 | Diutan gum | 0.1 |
| Example 3 | 0.2 | 0.005 | 0.105 | 2.595 | 0.3 | Diutan gum | 0.1 |
| Example 4 | 0.04 | 0.005 | 0.19 | 0 | 0 | — | 0 |
| Example 5 | 0.04 | 0.005 | 0.105 | 2.595 | 0.3 | — | 0 |
| Example 6 | 0.04 | 0.005 | 0.19 | 4.76 | 0.55 | Diutan gum | 0.1 |
| Example 7 | 0.04 | 0.005 | 0.105 | 2.595 | 0.3 | Xanthan gum | 0.3 |
| Example 8 | 0.04 | 0.005 | 0.105 | 2.595 | 0.3 | Welan gum | 0.2 |
| Example 9 | 0.04 | 0.005 | 0.19 | 0 | 0 | — | 0 |
| Example 10 | 0.04 | 0.005 | 0.105 | 2.595 | 0.3 | Diutan gum | 0.1 |
| Example 11 | 0.04 | 0.005 | 0.105 | 2.592 | 0.3 | Diutan gum | 0.1 |
| Comparative Example 1 | 0 | 0.01 | 0.19 | 4.76 | 0.55 | Diutan gum | 0.1 |
| Comparative Example 2 | 0.3 | 0.005 | 0.19 | 4.76 | 0.55 | Diutan gum | 0.1 |
| Comparative Example 3 | 1.0 | 0.005 | 0.19 | 4.76 | 0.55 | Diutan gum | 0.1 |
| Comparative Example 4 | 1.0 | 0.005 | 0.19 | 4.76 | 0.55 | Diutan gum | 0.1 |

TABLE 2-continued

| | Alkanol amine | | | Defoamer | | Solid content | |
|---|---|---|---|---|---|---|---|
| | Kind | % by mass | Ratio | (% by mass) | Surfactant (% by mass) | concentration (% by mass) | pH |
| Example 1 | Dimethyl ethanol amine | 0.1 | 3.8 | 0.3 | 0.3 | 3.75 | 9.3 |
| | Triethanol amine | 0.043 | | | | | |
| Example 2 | Dimethyl ethanol amine | 0.1 | 3.8 | 0.3 | 0.3 | 3.73 | 9.4 |
| | Triethanol amine | 0.043 | | | | | |
| Example 3 | Dimethyl ethanol amine | 0.1 | 3.7 | 0.3 | 0.3 | 3.91 | 9.4 |
| | Triethanol amine | 0.043 | | | | | |
| Example 4 | Dimethyl ethanol amine | 0.1 | 42.6 | 0 | 0 | 0.24 | 10.3 |
| Example 5 | Dimethyl ethanol amine | 0 1 | 3.9 | 0.3 | 0.3 | 3.65 | 9.6 |
| | Triethanol amine | 0.043 | | | | | |
| Example 6 | Dimethyl ethanol amine | 0 | 1.3 | 0.3 | 0.3 | 6.25 | 9.1 |
| | Triethanol amine | 0.079 | | | | | |
| Example 7 | Dimethyl ethanol amine | 0.1 | 3.6 | 0.3 | 0.3 | 3.95 | 9.5 |
| | Triethanol amine | 0.043 | | | | | |
| Example 8 | Dimethyl ethanol amine | 0.1 | 3.7 | 0.3 | 0.3 | 3.85 | 9.4 |
| | Triethanol amine | 0.043 | | | | | |
| Example 9 | — | 0 | 0.0 | 0 | 0 | 0.24 | 10.7 |
| Example 10 | Dimethyl ethanol amine | 0.8 | 22.5 | 0.3 | 0.3 | 3.75 | 10.1 |
| | Triethanol amine | 0.043 | | | | | |
| Example 11 | Dimethyl ethanol amine | 0.1 | 3.8 | 0.3 | 0.3 | 3.75 | 9.4 |
| | Triethanol amine | 0.043 | | | | | |
| Comparative Example 1 | Dimethyl ethanol amine | 0.1 | 2.9 | 0.3 | 0.3 | 6.21 | 9.4 |
| | Triethanol amine | 0.079 | | | | | |
| Comparative Example 2 | Dimethyl ethanol amine | 0.1 | 2.8 | 0.3 | 0.3 | 6.51 | 9.6 |
| | Triethanol amine | 0.079 | | | | | |
| Comparative Example 3 | Dimethyl ethanol amine | 0.1 | 2.5 | 0.3 | 0.3 | 7.21 | 8.5 |
| | Triethanol amine | 0.079 | | | | | |
| Comparative Example 4 | Dimethyl ethanol amine | 0.1 | 2.5 | 0.3 | 0.3 | 7.21 | 9.3 |
| | Triethanol amine | 0.079 | | | | | |

Evaluation

<Visibility>

The photocatalytic coating composition was stored in a constant temperature bath at 60° C., and 4 days later and 4 weeks later, the photocatalytic coating composition was taken out. The photocatalytic coating composition was diluted to 5 folds with ion-exchanged water; and then, the absorbance thereof at the wavelength of 664 nm (absorption peak of methylene blue can be seen) was obtained by using a spectrophotometer (manufactured by Shimadzu Corp., UV-3150). Also, the photocatalytic coating composition was applied by spray coating in an amount of 20 g/m² on an aluminum plate coated with a white acryl paint, and then, the visibility of the photocatalyst coated film was judged by visual observation of the appearance of the film. The results were as shown in Table 2. It was confirmed that when the layered silicate was added, decrease of the absorbance from the initial value was small and coloring property and visibility were sufficient. It was confirmed, on the other hand, that when the layered silicate was not added or when a stabilizer other than the layered silicate was added, the absorbances after 4 days and further after 4 weeks decreased significantly, the color significantly changed to purple; and visibility was not sufficient. The changes of the absorbances of the photocatalytic coating compositions of Example 1 and Comparative Example 1 over time are shown in FIG. 1.

<Viscosity>

The photocatalytic coating composition was stored in a constant temperature bath at 60° C., and 1 week later and 4 weeks later, the photocatalytic coating composition was taken out. The viscosity of the photocatalytic coating composition before storage, the viscosity of the photocatalytic coating composition after storage for 1 week, and the viscosity of the photocatalytic coating composition after storage for 4 weeks were measured with a Brookfield viscometer (manufactured by Toki Sangyo Co., Ltd., TV-10, spindle M2) under the conditions that the rotation speed was 6 rpm and the temperature was 25° C. As to the rotor, a M2 rotor was used. The results were as shown in Table 3. It was confirmed that, in the photocatalytic coating composition of Example 1 which has the mass ratio of the alkanol amines of 3.8% by mass (>2.5% by mass), the initial viscosity was 635 mPa·s, whereas the viscosity after 4 weeks was 573 mPa·s, and consequently the viscosity change rate was small. It was confirmed on the other hand that, in the photocatalytic coating composition of Example 6 which has the mass ratio of the alkanol amines of 1.3% by mass (<2.5% by mass), the initial viscosity was 705 mPa·s, whereas the viscosity after 4 weeks was 355 mPa·s, and consequently the viscosity change rate was larger than that of the photocatalytic coating composition of Example 1. The viscosity change rate of Example 6 was acceptable in a practical use. Here, the viscosity change rate was calculated by dividing the value obtained by subtracting the initial viscosity from the viscosity after 1 week or the viscosity after 4 weeks which has a larger difference from the initial viscosity by the value of the initial viscosity (unit: %).

<Strength of Photocatalyst Coated Film>

The photocatalytic coating composition was applied by spray coating in an amount of 20 g/m² on an aluminum plate coated with a white polyester paint, and then, the strength of the photocatalyst coated film formed on the surface of the aluminum plate was evaluated with the judgment criteria as shown below. The results were as shown in Table 2.

Judgement Criteria:

◯: Strength was sufficient.

Δ: Strength was somewhat weak but acceptable in a practical use.

It was confirmed that, in the photocatalyst coated film formed with the photocatalytic coating composition of Example 1 which has the mass ratio of the alkanol amines of 3.8% by mass and in the photocatalyst coated film formed with the photocatalytic coating composition of Example 10 which has the mass ratio of the alkanol amines of 22.5% by mass, sufficient strengths could be obtained. On the other hand, in the photocatalyst coated film formed with the photocatalytic coating composition of Example 4 which has a relatively large mass ratio of the alkanol amines of 42.6% by mass, the strength was somewhat weaker than that of Example 1. However, the strength was acceptable in a practical use.

TABLE 3

| | Absorbance (664 nm) | | | Visual appearance | | Visual appearance | | Viscosity (mPa · s) | | | |
|---|---|---|---|---|---|---|---|---|---|---|---|
| | Initial | 60° C. after 4 days | 60° C. after 4 weeks | Color after 4 days | Visibility after 4 days | Color after 4 weeks | Visibility after 4 weeks | Initial | 60° C. after 1 week | 60° C. after 4 weeks | Strength of film |
| Example 1 | 0.95 | 0.90 | 0.74 | Blue | Good | Blue | Good | 635 | 639 | 573 | ◯ |
| Example 2 | 0.88 | 0.87 | 0.90 | Blue | Good | Blue | Good | 672 | 650 | 594 | — |
| Example 3 | 1.76 | 1.76 | 1.76 | Blue | Good | Blue | Good | 781 | 878 | 840 | — |
| Example 4 | 0.70 | 0.69 | 0.58 | Blue | Good | Blue | Good | — | — | — | Δ |
| Example 5 | 0.70 | 0.68 | 0.65 | Blue | Good | Blue | Good | — | — | — | — |
| Example 6 | 1.09 | 1.23 | 1.24 | Blue | Good | Blue | Good | 705 | — | 355 | — |
| Example 7 | 1.08 | 1.19 | 1.25 | Blue | Good | Blue | Good | — | — | — | — |
| Example 8 | 1.22 | 1.25 | 1.28 | Blue | Good | Blue | Good | — | — | — | — |
| Example 9 | 0.73 | 0.73 | 0.57 | Blue | Good | Blue | Good | — | — | — | — |
| Example 10 | 0.87 | 0.91 | 0.70 | Blue | Good | Blue | Good | — | — | — | ◯ |
| Example 11 | 0.62 | — | 0.67 | — | — | Blue | Good | — | — | — | — |
| Comparative Example 1 | 0.94 | 0.48 | 0.26 | Purple | Bad | Purple | Bad | 595 | 583 | 564 | — |
| Comparative Example 2 | 0.62 | 0.46 | — | Purple | Bad | — | — | — | — | — | — |
| Comparative Example 3 | 0.60 | Unmeasurable | — | Purple (turbid) | — | — | — | — | — | — | — |
| Comparative Example 4 | 0.93 | 0.31 | 0.14 | Purple | Bad | Purple | Bad | — | — | — | — |

What is claimed is:

1. A photocatalytic coating composition comprising photocatalyst particles, a basic dye, a layered silicate, and a dispersion medium, wherein liquid property of the photocatalytic coating composition is basic.

2. The photocatalytic coating composition according to claim 1, wherein the photocatalytic coating composition further comprises a polysaccharide thickener.

3. The photocatalytic coating composition according to claim 2, wherein the polysaccharide thickener is a polysaccharide thickener containing glucuronic acid and/or rhamnose in its main chain.

4. The photocatalytic coating composition according to claim 3, wherein the polysaccharide thickener containing glucuronic acid and/or rhamnose in its main chain is Diutan gum and/or Welan gum.

5. The photocatalytic coating composition according to claim 1, wherein
the photocatalytic coating composition further comprises at least one selected from the group consisting of primary to tertiary alkanol amines, and
the ratio of the mass of the at least one selected from the group consisting of primary to tertiary alkanol amines relative to the mass of total solid content in the photocatalytic coating composition is in the range of 2.5% or more by mass to 25% or less by mass.

6. The photocatalytic coating composition according to claim 1, wherein the photocatalytic coating composition further comprises an inorganic compound other than the photocatalyst particles.

7. The photocatalytic coating composition according to claim 6, wherein the inorganic compound is a fine particle of an oxide and/or a hydroxide having a particle diameter of 50 nm or less.

8. The photocatalytic coating composition according to claim 1, wherein the ratio of the mass of total solid content in the photocatalytic coating composition relative to the mass of the entire photocatalytic coating composition is in the range of 0.1% or more by mass to 10% or less by mass.

9. The photocatalytic coating composition according to claim 1, wherein pH of the photocatalytic coating composition is in the range of 8.0 or more to 12.0 or less.

10. The photocatalytic coating composition according to claim 1, wherein a color imparted to the coating composition by the basic dye disappears by photolysis with a solar light or decomposition of the basic dye by the photocatalyst particles.

11. The photocatalytic coating composition according to claim 1, wherein the layered silicate is a colorless, synthetic, layered silicate.

* * * * *